Oct. 29, 1963    R. D. BRACKETT    3,108,526
COMBINED RANGE- AND VIEW-FINDERS
Filed March 6, 1961    2 Sheets-Sheet 1

INVENTOR.
Robert D. Brackett
BY Brown and Mikulka
Attorneys

Oct. 29, 1963 R. D. BRACKETT 3,108,526
COMBINED RANGE- AND VIEW-FINDERS
Filed March 6, 1961 2 Sheets-Sheet 2

INVENTOR.
Robert D. Brackett
BY
Brown and Mikulka
Attorneys

United States Patent Office 3,108,526
Patented Oct. 29, 1963

3,108,526
COMBINED RANGE- AND VIEW-FINDERS
Robert D. Brackett, Wakefield, Mass., assignor to Polaroid Corporation, Cambridge, Mass., a corporation of Delaware
Filed Mar. 6, 1961, Ser. No. 93,415
9 Claims. (Cl. 95—44)

This invention relates to range and view finders for use in combination with photographic cameras and to improvements therein.

Combined range and view finder systems have been proposed wherein a single eye window is used for simultaneous viewing and ranging. The range finder may be of the type wherein an image received from a measuring beam is brought into superposition with a direct view image in the viewer's line of sight. This is normally accomplished by deviating the path of the measuring beam by means movable in response to focusing movement of the camera lens. The direct view image may be received through a view finder, the design of which, for example, may be that of a reversed Galilean. The size of the image received from the measuring beam, that is, the superimposed image, is usually confined to a portion of the view finder image by placing a member with an aperture therein in the path of the measuring beam.

Another common innovation is the provision of means indicating to the viewer changes in field coverage for different focusing distances. These may be in the nature of fixed reference marks within the view finder or various types of framing arrangements. It is often convenient to construct a frame with two adjacent sides fixed and two sides which move in conjunction with focusing movement of the camera lens in such a way that the field of view outlined by the frame corresponds to the field included by the camera lens. The frame may be placed directly in the viewer's line of sight, or an image of the frame may be projected into the line of sight. The framing means shown in connection with the present invention is of the latter type, but the invention contemplates the use of any of the above-mentioned means. In previously known combined range and view finders, the position of the superimposed image remains fixed in the field of view as the field of coverage, as indicated by the movable projected frame, changes. Thus, the superimposed image is centered in the field included by the view finder, wherein changes in field coverage are indicated by movement of two adjacent sides thereof, at only one focus position. This is true, of course, in this type of view finder irrespective of the framing means used, or even when none are used at all.

The present invention has as an object the provision of a novel and improved superimposed image range finder in combination with a view finder.

A further object is the provision of a novel, combined range and view finder wherein the position of the image received from the measuring beam is movable in response to focusing movement of the camera lens.

Still another object is the provision of a superimposed image range finder in combination with a movable frame view finder in which the range finder image moves in such a way as to be always centered in the field defined by the frame. This offers the advantage of using the superimposed image as a centering device, particularly useful in photographing moving objects.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
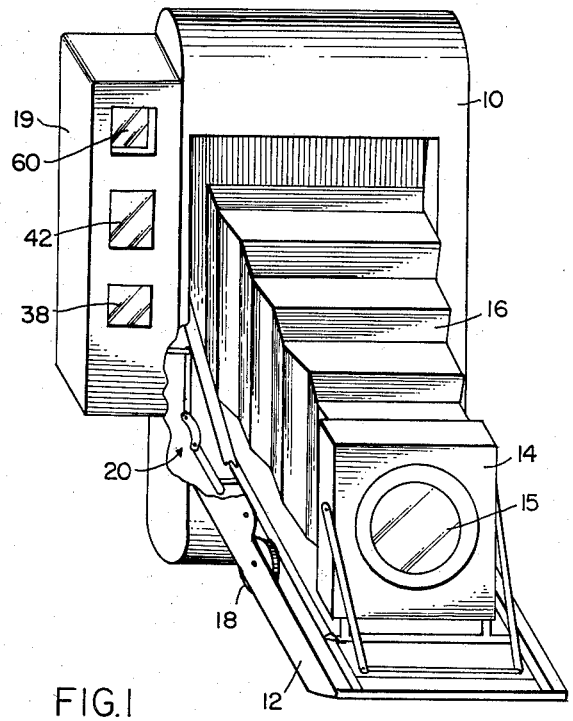
FIGURE 1 is a perspective view, partly in section, of a camera embodying the present invention.
Figure 3:
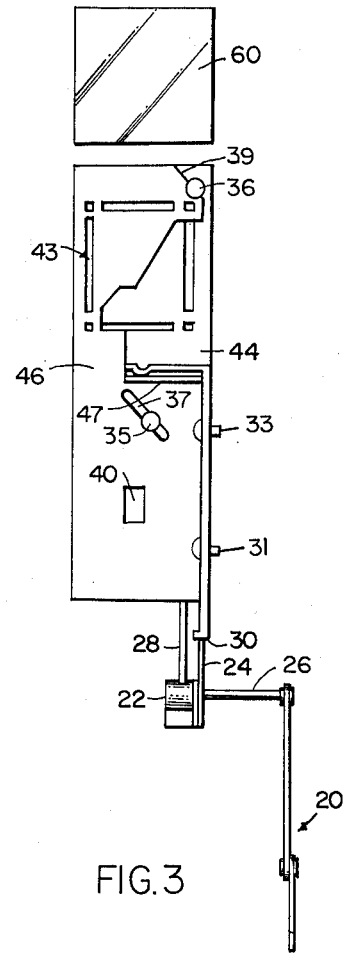
FIG. 3 is a front elevation of the parts illustrated in FIG. 2.
Figure 2:
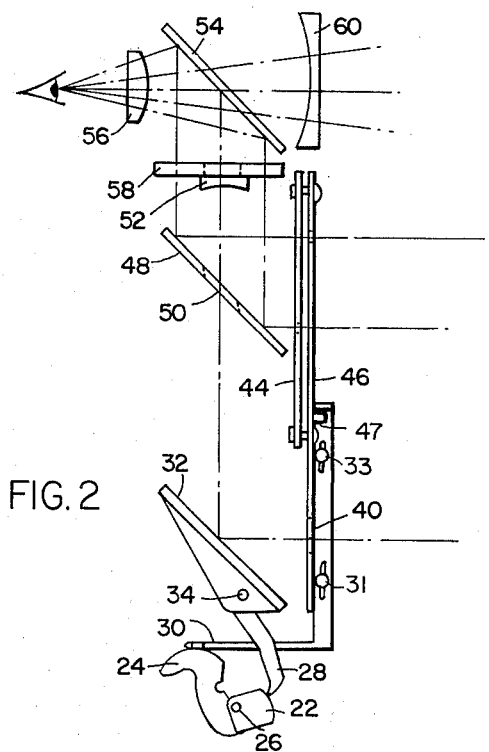
FIG. 2 is a schematic side elevation of the range and view finder with some parts removed.

Referring now to the drawings, in FIG. 1 is seen an ordinary folding camera, opened to the operating position, consisting of a body 10, a camera bed 12, and a lens support 14 holding the camera objective lens 15 and connected to the body 10 by an extensible bellows 16. The lens support 14 may be moved, thus focusing the objective lens 15, by turning focusing knob 18. Lens support 14 and focusing knob 18 may be mounted and movement effected by any convenient means well known to those skilled in the art. Also, the camera shown in FIG. 1 is used only for purposes of illustration and the invention is not confined exclusively to a combination with this configuration.

Housing 19, containing a combined range-view finder, is shown mounted on the side of camera body 10. Connected to move with the lens support 14 when focusing knob 18 is turned is mechanical linkage 20, constructed and arranged in such a manner as to impart desired rotary motion to cams 22 and 24 for which a common shaft 26, turned by mechanical linkage 20, is provided. As focusing knob 18 is turned, mechanical linkage 20 is moved rotating cam 22, which imparts motion to follower arm 28, and cam 24, which imparts motion to follower arm 30.

In the embodiment illustrated, the measuring beam for the range finder enters through window 38 in housing 19. It then passes through opening 40 and is reflected by mirror 32 which is pivotally mounted on camera body 10 by pin 34. Movement of follower arm 28 by cam 22 rotates mirror 32 about pin 34, thus providing means for deviating the measuring beam. Other means known in the art may also be used for deviating the measuring beam in response to focusing movement of the camera objective lens, such as the rotation of optical wedges, prisms, etc.

A second window 42 is provided in housing 19 to allow the passage of light through the field-defining frame 43, two sides of which are contained in stationary plate 44 and the other two in movable mask 46. As follower arm 30 is moved by cam 24, it slides on rivets 31 and 33 to bear on flange 47 of movable mask 46. The motion imparted from cam 24 through arm 30 to flange 47 causes mask 46 to change position, sliding diagonally on rivets 35 and 36, guided by slot 37 and surface 39. Suitable known means, such as spring bias, may be provided to insure positive contact between cam 22 and follower 28, cam 24 and follower 30, and follower 30 and flange 47. Light passing through frame 43 is reflected by fixed mirror 48 to dichroic or semi-transparent mirror 54, and from there through ocular 56 to the eye of the viewer. Light from mirror 32 passes through an opening 50 in mirror 48, through lens 52, which has a magnifying power of .5, and is reflected by semi-transparent mirror 54 through ocular 56 to the eye of the viewer. The frame image reflected by mirror 48 passes through glass 58 upon which lens 52 is mounted. Direct rays from the object pass through view finder lens 60, which also has a magnifying power of .5, semi-transparent mirror 54 and ocular 56 to the eye of the viewer. Thus, the viewer sees the object directly through a lens of .5, magnification and a superimposed image of a portion of the object reflected from a movable mirror and also passing through a lens of .5 magnification. He also sees a projected image of a field-defining frame which has not passed through a magnifying lens.

Figure 5:
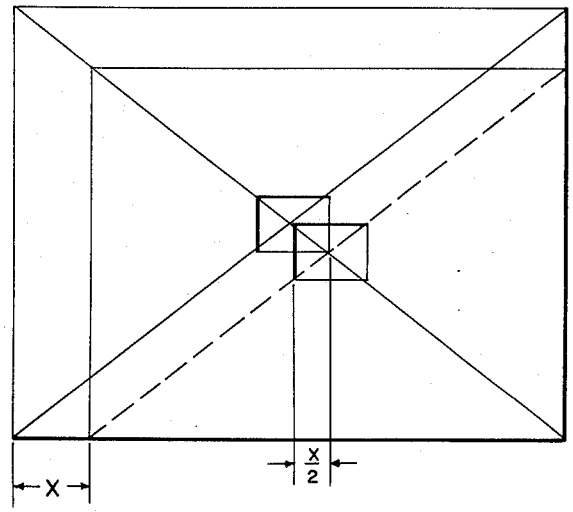
FIG. 5 illustrates geometrically the change in field coverage indicated by movement of the projected frame with corresponding movement of the superimposed image.

Since opening 40 is contained within mask 46, it moves with the same motion and direction as the movable sides of projected frame 43. Referring to FIG. 5, it will be seen that if the motion of the movable portion of the frame is represented by distance "X", then the position of the center of the frame will be displaced by one half of this distance or X/2. Therefore, it would appear that if the opening moves with the same motion and direction as the frame, its motion would be twice the distance required to keep it centered as the frame size changes. However, if the optical system has a magnification of .5, the apparent motion of the opening will be X/2 and the superimposed image will remain centered in the projected frame throughout the focusing range. This is true since the superimposed image passes through the magnifying lens while the projected frame image does not.

Figure 4:
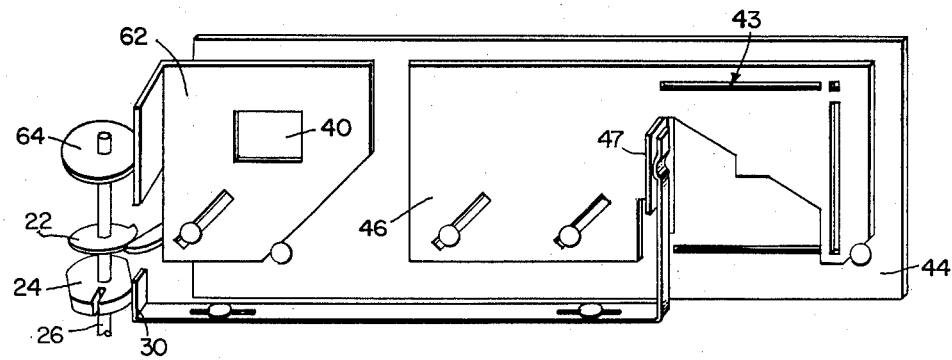
FIG. 4 is a perspective view of an alternate construction of some parts of the assembly seen in FIGS. 2 and 3.

If it is desired to have an optical system with other than .5 magnification, the superimposed image may be centered by providing independently moving members for the frame mask and the mask containing the opening through which the measuring beam passes. In the embodiment seen in FIG. 4, opening 40 is contained in mask 62. Cams 22 and 24 are rotated as before, imparting motion to followers 28 and 30, respectively. Cam 64 has been added to rotate with cams 22 and 24, and impart motion to mask 62. The direction of mask 62 is the same as that of mask 46, but the distance mask 62 moves with respect to mask 46 is that distance necessary to keep the superimposed image centered within frame 43 throughout the focusing range of the camera. This is a function of the particular optical magnification used and is easily controlled by the design of cam 64 to make the apparent motion of the superimposed image, as defined by opening 40, one half that of the movable sides of frame 43.

It would also be possible, of course, to place a magnifying lens in the path of the movable frame image projected from mirror 48. This could be included, for example, in place of glass 58. This would change the apparent motion of the frame and, in order to keep the superimposed image centered, the magnifying power of lenses 52 and 60 would be one half that of any lens placed in the path of the movable frame image.

Thus, the invention contemplates the use of various optical and mechanical arrangements. The image received from the measuring beam and superimposed on another image may be used as a centering device since the opening through which the measuring beam passes is movable in response to focusing movement of the camera lens. Optical means may be used to keep the apparent motion of the superimposed image centered in the field included by the lens, whether or not additional means are provided in the view finder to frame said field.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic camera having an objective lens and means for effecting movement thereof to focus a scene to be photographed at the focal plane of said camera, the combination therewith of: viewing means arranged to receive a first beam from said scene, framing means visible in said viewing means and defining the boundaries of an area at said scene, fixed means defining a first portion of said boundaries and movable means defining a second portion of said boundaries, first means for so moving said movable means in response to focusing movement of said objective lens that said area corresponds to the portion of said scene which is focused by said objective lens at the focal plane of the camera, said movable means being so arranged with respect to said fixed means that the position of the center of said area shifts as said movable means is moved, reflecting means arranged to receive a measuring beam from said scene and deflect the same into the field of view of said viewing means, second means for so moving said reflecting means in response to said focusing movement of said objective lens as to cause said measuring beam to be in coincidence with the corresponding portion of said first beam when said scene is properly focused at said focal plane, and third means fixedly defining the periphery of said measuring beam and movable in response to said focusing movement to cause said measuring beam as it appears within said framing means to be centered therein throughout the focusing range of said objective lens.

2. The invention according to claim 1 wherein said area is substantially rectangular in shape, having two adjacent sides defined by said fixed means and the other two adjacent sides defined by said movable means.

3. The invention according to claim 2 wherein said movable means includes a fixed aperture, said aperture being disposed in the path of said measuring beam and defining the peripheral boundaries thereof.

4. In a photographic camera having an objective lens and means for effecting movement thereof to focus a scene to be photographed at the focal plane of said camera, the combination therewith of: viewing means for receiving a direct beam from said scene, a frame visible in said viewing means, said frame being in the form of a rectangle having two adjacent sides defined by a fixed member and the other two adjacent sides defined by a first movable member, said first movable member being so movable in response to focusing movement of said objective lens that the area included by said rectangle corresponds to the portion of said scene which is focused by said objective lens at the focal plane of the camera, whereby the position of the center of said rectangle shifts as said first movable member is moved, reflecting means arranged to receive a measuring beam from said scene and deflect the same into the field of view of said viewing means, means for so moving said reflecting means in response to said focusing movement as to cause said measuring beam to be in coincidence with the corresponding portion of said direct beam when said scene is properly focused at said focal plane, a second movable member having a fixed aperture therein, said aperture being disposed in the path of said measuring beam and defining the peripheral boundaries thereof, said second movable member being movable in response to said focusing movement, the relative movement of said first and second movable members being such that the movement of said measuring beam as it appears in said viewing means is one half the movement of said frame as it appears in said viewing means, whereby the position of said measuring beam remains centered in said rectangle as the latter changes in size.

5. The invention according to claim 4 wherein said first and second movable members are movable in response to said focusing movement by means of a mechanical linkage between said objective lens and at least one cam, and cam followers which translate movement of said cam to said first and second movable members.

6. The invention according to claim 5 wherein said direct beam passes through a first magnifying lens, said measuring beam passes through a second magnifying lens of the same power as said first magnifying lens, said frame is visible without magnification, and said cam and followers are so constructed and arranged that as said frame changes in size said measuring beam remains centered therein as seen in said viewing means.

7. In a photographic camera having an objective lens and means for effecting movement thereof to focus a scene to be photographed at the focal plane of said camera, the combination therewith of: viewing means having a field of view including at least said scene, framing means comprising a rectangle having two adjacent sides defined by fixed means and the other two adjacent sides defined by movable means, first reflecting means for projecting an image of said framing means into said field of view, second reflecting means for receiving a measuring beam from said scene and projecting the same into said field of view, said movable member having therein a fixed aperture arranged in the path of said measuring beam and defining the peripheral boundaries thereof, means for translating said focusing movement to said second reflecting means whereby said measuring beam is in coincidence with the corresponding portion of said field of view seen in said viewing means when said scene is properly focused at said focal plane, and means for translating said focusing movement to said movable member whereby said rectangle defines that portion of said scene which is focused by said objective lens at said focal plane and the position of said measuring beam as it appears in said field of view moves to remain at the center of said rectangle as the latter changes in size throughout the focusing range of said objective lens.

8. The invention according to claim 7 wherein both said field of view seen in said viewing means and said measuring beam pass through a lens of .5 magnification and said image of said framing means is visible in said viewing means without magnification, whereby the apparent motion of said measuring beam as seen in said viewing means is one-half that of said two adjacent sides of said rectangle defined by said movable means.

9. The invention according to claim 8 wherein said first reflecting means comprises a fixed mirror and said second reflecting means comprises a rotatable mirror.

References Cited in the file of this patent
UNITED STATES PATENTS

| | | |
|---|---|---|
| 1,166,032 | Woodbury | Dec. 28, 1915 |
| 2,187,246 | Nerwin | Jan. 16, 1940 |
| 2,737,844 | Jerome et al. | Mar. 13, 1956 |
| 2,805,608 | Leitz et al. | Sept. 10, 1957 |
| 2,943,549 | Nerwin | July 5, 1960 |